United States Patent [19]

Quinones et al.

[11] Patent Number: 5,472,313
[45] Date of Patent: Dec. 5, 1995

[54] TURBINE DISK COOLING SYSTEM

[75] Inventors: Armando J. Quinones, Cincinnati; Harold P. Rieck, Jr., West Chester; Richard W. Albrecht, Fairfield, all of Ohio; Michael A. Sullivan, Ballston Spa, N.Y.; Robert H. Weisgerber, Loveland; Larry W. Plemmons, Fairfield, both of Ohio

[73] Assignee: General Electric Company, Cincinnati, Ohio

[21] Appl. No.: 264,743

[22] Filed: Jun. 23, 1994

Related U.S. Application Data

[63] Continuation of Ser. No. 65,102, May 19, 1993, abandoned, which is a continuation-in-part of Ser. No. 785,396, Oct. 30, 1991, abandoned.

[51] Int. Cl.$^6$ .................................................. F04D 29/00
[52] U.S. Cl. ........................... 415/115; 415/116; 415/175
[58] Field of Search .................................. 415/115, 116, 415/175, 176

[56] References Cited

U.S. PATENT DOCUMENTS

| | | | |
|---|---|---|---|
| 2,788,951 | 4/1957 | Flint | 416/198 A |
| 3,031,132 | 4/1962 | Davis | 415/115 |
| 3,982,852 | 9/1976 | Andersen et al. | 416/95 |
| 4,004,860 | 1/1977 | Gee | 416/2 |
| 4,127,988 | 12/1978 | Becker | 415/115 |
| 4,576,547 | 3/1986 | Weiner et al. | 415/116 |
| 4,645,416 | 2/1987 | Weiner | 415/115 |
| 4,664,599 | 5/1987 | Robbins et al. | 416/198 |
| 4,844,694 | 7/1989 | Naudet | 416/198 A |
| 4,880,354 | 11/1989 | Teranishi et al. | 416/95 |

FOREIGN PATENT DOCUMENTS

| | | | |
|---|---|---|---|
| 1040535 | 10/1978 | Canada | 415/115 |
| 966804 | 10/1950 | France | 416/198 A |

*Primary Examiner*—John T. Kwon
*Attorney, Agent, or Firm*—Andrew C. Hess; Patrick R. Scanlon

[57] ABSTRACT

A turbine disk cooling system for a gas turbine engine of a type having a compressor section including first and second disks connected by a seal and defining a compressor interstage volume, a turbine section including first and second stage disks connected by a seal and defining a turbine inner stage volume, and a compressor shaft interconnecting the compressor disks with the turbine disks including orifices located in the compressor seal for allowing air in the compressor section to enter the compressor interstage volume, and a radial inflow impeller for guiding the compressor air towards the compressor shaft. The impeller including a plurality of radially-extending conduits suspended in the compressor interstage volume, the conduits having a plurality of interior, radially-extending passages for conveying the compressor air from the orifice to the compressor shaft. The cooling system further including ducts concentric with the engine centerline for conveying air from the compressor interstage volume to the turbine section, wherein the first stage turbine disk includes an aft shaft having a plurality of openings therethrough allowing the flow of air from the ducts into the turbine interstage volume. The tubular conduit elements having a radially outer portion divided into a plurality of spaced longitudinal segments and a radially inner portion protruding from the conduit element and including a peripheral flange shaped to engage the peripheral flange of the conduit elements.

16 Claims, 19 Drawing Sheets

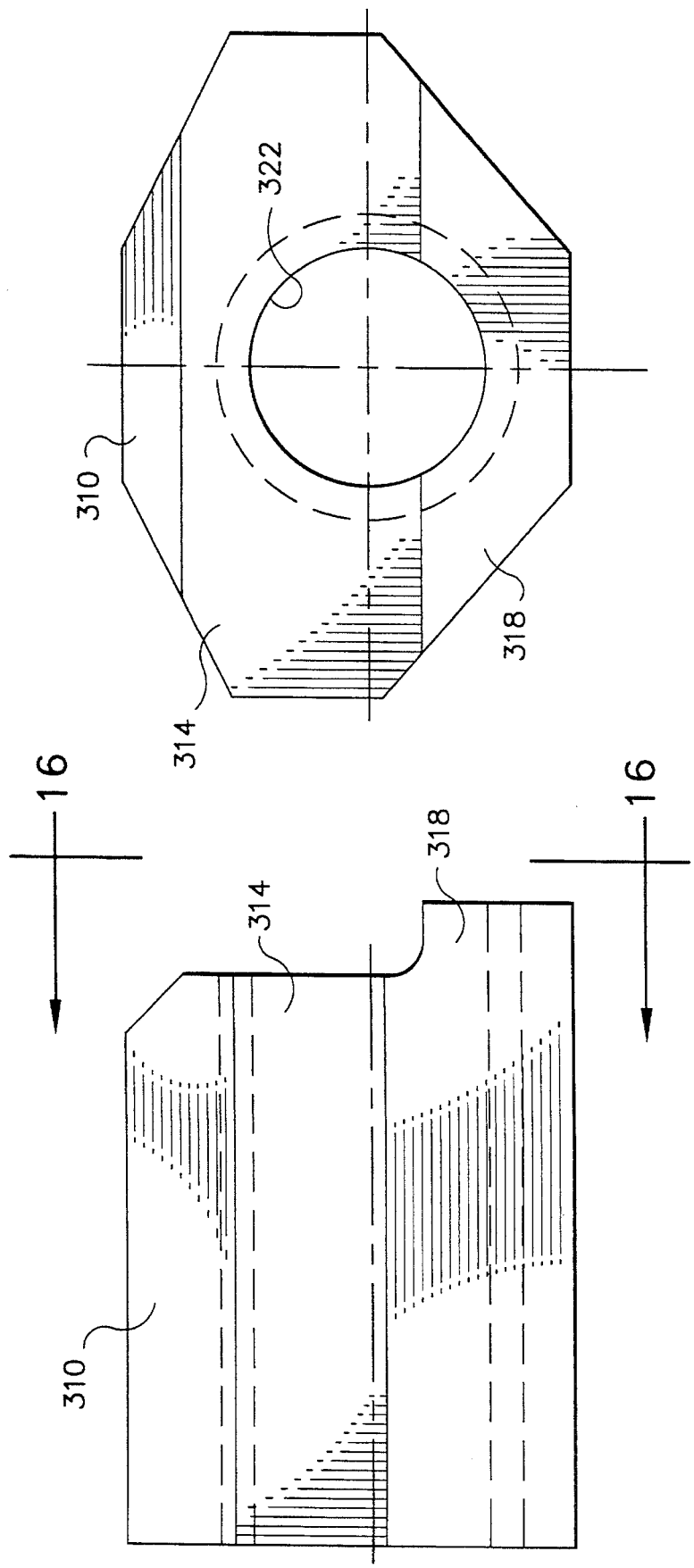

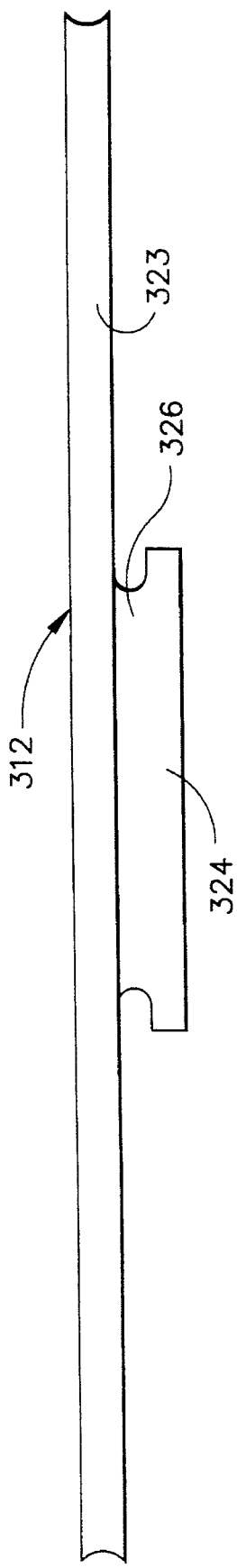
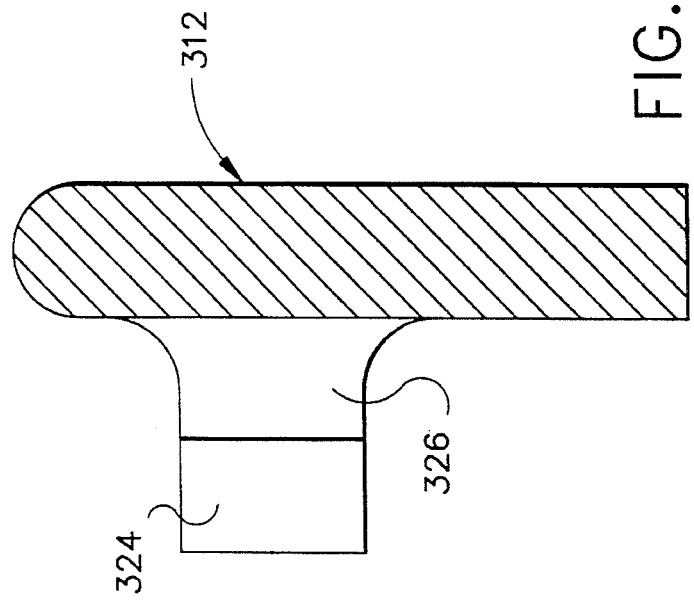
FIG. 17
FIG. 18

5,472,313

TURBINE DISK COOLING SYSTEM

This application is a Continuation of application Ser. No. 08/065,102, filed May 19, 1993, abandoned, which is CIP of Ser. No. 07/785,396 filed Oct. 30, 1991, abandoned.

BACKGROUND OF THE INVENTION

The present invention relates to gas turbine engines and, more particularly, to aircraft-type high bypass ratio turbine engines having multi-stage compressor and turbine sections.

A typical modern gas turbine aircraft engine, particularly of the high bypass ratio type, includes multi-stage high pressure compressor and turbine sections interconnected by a central compressor shaft or, in some models, a forward shaft. In the latter instance, the forward shaft extends between the webs of the last stage high pressure compressor disk and the fist stage high pressure turbine disk webs. The high pressure turbine section typically includes first and second stage disks in which the second stage disk is attached to the first stage disk by a bolted connection. The interstage volume between the first and second stage disks is enclosed by a shield extending between the out peripheries of the turbine disks. The shield is generally cylindrical in shape and its wall defines an outwardly convex configuration.

The first and second stage disks are isolated by a forward faceplate, attached to the forward face of the first stage disk, and an aft seal attached to the rearward face of the second stage disk web. Typically, cooling air ducted externally from the compressor section is circulated within the volumes defined by the faceplate and aft seal, as well as the interstage volume, in order to cool the disks and the blades they support. The cooling air is conveyed radially outwardly from the turbine section through channels formed in the turbine blades.

In such engines, virtually all of the connections between components are effected through bolting. That is, the forward faceplate is connected to the stage one disk by a circular pattern of bolts extending about the faceplate and disk. The inner periphery of the faceplate is bolted to a disk positioned forwardly of the first stage disk. Similarly, the interstage thermal seal is connected to the turbine disks through bolts in a circular pattern, typically clamping angular blade retaining rims to the opposite faces of the turbine disks as well. In addition, the second stage disk includes a rearwardly-extending cone which is bolted to the aft seal.

A disadvantage with such bolted connections is that they require holes to be formed in the disks which cause stress concentrations and limit the useful lives of the seals and disks. Furthermore, additional disk weight is required to sustain the stresses imposed by the bolt and bolt hole engagement. Accordingly, there is a need for a turbine engine design which minimizes the use of bolted connections between components, yet provides a turbine engine which is relatively easy to assemble and disassemble.

Another disadvantage with such engines is that alignment of the first and second stage disks is difficult to maintain during assembly and operation, which may result in excessive vibrations during operation. Further, in order to convey cooling compressor air to the turbine section, it is necessary to duct the compressor air externally of the turbine and compressor sections. This ducting occupies space in the engine nacelle and adds weight to the engine. Accordingly, there is a need for mounting the first and second stage disks which minimizes alignment problems and further, there is a need for a design which eliminates the need for external ducting of cooling compressor air to the turbine section.

SUMMARY OF THE INVENTION

The present invention is an aircraft-type gas turbine engine in which the forward faceplate, interstage seal, aft seal and sump seal in the turbine section are connected to the turbine disks by boltless connections, thereby eliminating the time-consuming task of properly torquing the bolts and eliminating the stress concentration problems created by the existence of bolted connections. Further, the present invention provides a central conduit for conveying cooling air from the compressor section to the turbine section which ducts the compressor air internally of the compressor and turbine sections to the interstage volume in the turbine section, thereby eliminating the need for external duct work.

Additionally, alignment problems with respect to the first and second stage disks are eliminated with the invention, which includes a first stage disk having an aft shaft which supports the second stage disk. Relative rotation between the disk is prevented by providing a splined connection between the second stage disk and aft shaft of the first stage disk. The second stage disk includes a conical, forwardly-projecting arm which terminates in a mate face and pilot that engages the stage one aft shaft at a location between the second stage bore and spline connection. Axial movement of the second stage disk is prevented by a locking nut which is threaded on the aft shaft and urges the second stage disk forward to ensure engagement of the mate face and pilot with the aft shaft.

The aft seal and sump seal are attached to the second stage disk by an interlocking bayonet connection. This bayonet connection prevents relative axial and circumferential movement of these components relative to the second stage disk. Loosening of the locking nut is prevented by providing the sump seal with a plurality of tabs which engage the locking nut mounted on the aft shaft.

Similarly, the interstage thermal shield is attached to the stage one disk by a bayonet connection which prevents relative axial movement and includes a peripheral rabbet which engages the stage one disk to prevent relative forward axial and outward radial movement of the seal. Circumferential movement is prevented by providing at least one stage one disk blade with a tab that engages spaced tabs on the seal.

The aft arm of the interstage seal is secured from relative axial movement by a split ring which is seated within opposing grooves formed in the aft arm and second stage disk. The interstage seal is generally cylindrical in shape and includes forward and aft arms which have inwardly convex, inverse catenary, contours to withstand stressing. The forward and aft arms are sized to receive a preload when mounted between the turbine disks.

The interstage seal includes a central web and bore which is attached to the aft shaft by a bayonet connection to prevent deflection of the bore. The bayonet connection includes scallops which allow cooling air to circulate through the interstage volume.

The forward seal is annular in shape and sized to extend outwardly from the forward shaft to the periphery of the stage one disk. The forward seal is mounted on the stage one disk by a bayonet connection at its inner periphery which prevents relative forward axial movement of the forward seal. Relative circumferential movement is prevented by providing locking pins, secured by a split ring, in between the tabs of the bayonet engagement. The locking pins are positionable to serve a balancing function as well. The forward seal includes a peripheral rabbet which engages a corresponding rabbet formed on the stage one disk to prevent relative outward radial and rearward axial movement of the forward seal. In an alternate embodiment, a locking cylinder is used instead of the locking pins, and includes flanges that engage the tabs.

The outer periphery of the faceplate also engages the stage one disk in a bayonet connection. The faceplate includes a plurality of radially- extending vanes to direct cooling air, which enters the volume between the faceplate and disk, radially outwardly to the periphery of the disk and to the disk blades.

Cooling air is provided to the interstage volume along a cylindrical passageway which extends beneath the bores of the compressor and turbine disks and outwardly of a cylindrical duct concentric with the engine centerline. Cooling air is bled into an interstage volume between compressor disks and is directed radially inwardly by a plurality of radial inflow impellers attached to an annular mounting bracket bolted to a selected compressor disk. The impellets are tube shaped and direct cooling air radially inwardly toward the duct, where the cooling air is directed rearwardly to the turbine section.

The aft shaft of the stage one disk includes orifices which allow this cooling air to enter the interstage volume between the turbine disks and bathe the second stage bore in cooling air before mixing with cooling air from the stage one disk and exiting through and cooling the stage two disk blades.

Accordingly, it is an object of the present invention to provide an aircraft-type gas turbine engine in which bolted connections between the first and second stage disks, forward seal, aft seal and sump seal, and interstage seal are eliminated, thereby eliminating the weight and stress concentrations caused by bolted connections; an engine in which first and second stage turbine alignment problems are minimized by mounting the second stage disk on an aft shaft of the first stage disk; an engine in which turbine cooling air is conveyed internally from the compressor section to the turbine section, thereby eliminating external duct work; an engine in which radial flow impellets are mounted between selected disks in the compressor section to direct cooling air radially inwardly toward the engine centerline, and a conduit to convey the air rearwardly to the turbine section; an engine in which cooling air is supplied to first and second stage turbine disks and blades through separate circuits, thereby enhancing efficiency and permitting optimal cooling air flow for each component; engine in which it is relatively simple to assemble or stack components of the turbine section; and an engine in which the turbine section components are relatively easy to maintain and in which component weight is minimized.

Other objects and advantages of the present invention will be apparent from the following description, the accompanying drawings and the appended claims.

BRIEF DESCRIPTION OF THE DRAWING

FIG. 15 is a side elevation of the locking nut shown in FIG. 12;

FIG. 16 is a view of the locking nut taken at line 16—16 of FIG. 15;

FIG. 17 is a top plan view of the locking ring of FIG. 12;

FIG. 18 is a side elevational view of the locking ring of FIG. 17;

DETAILED DESCRIPTION

Figure 1:
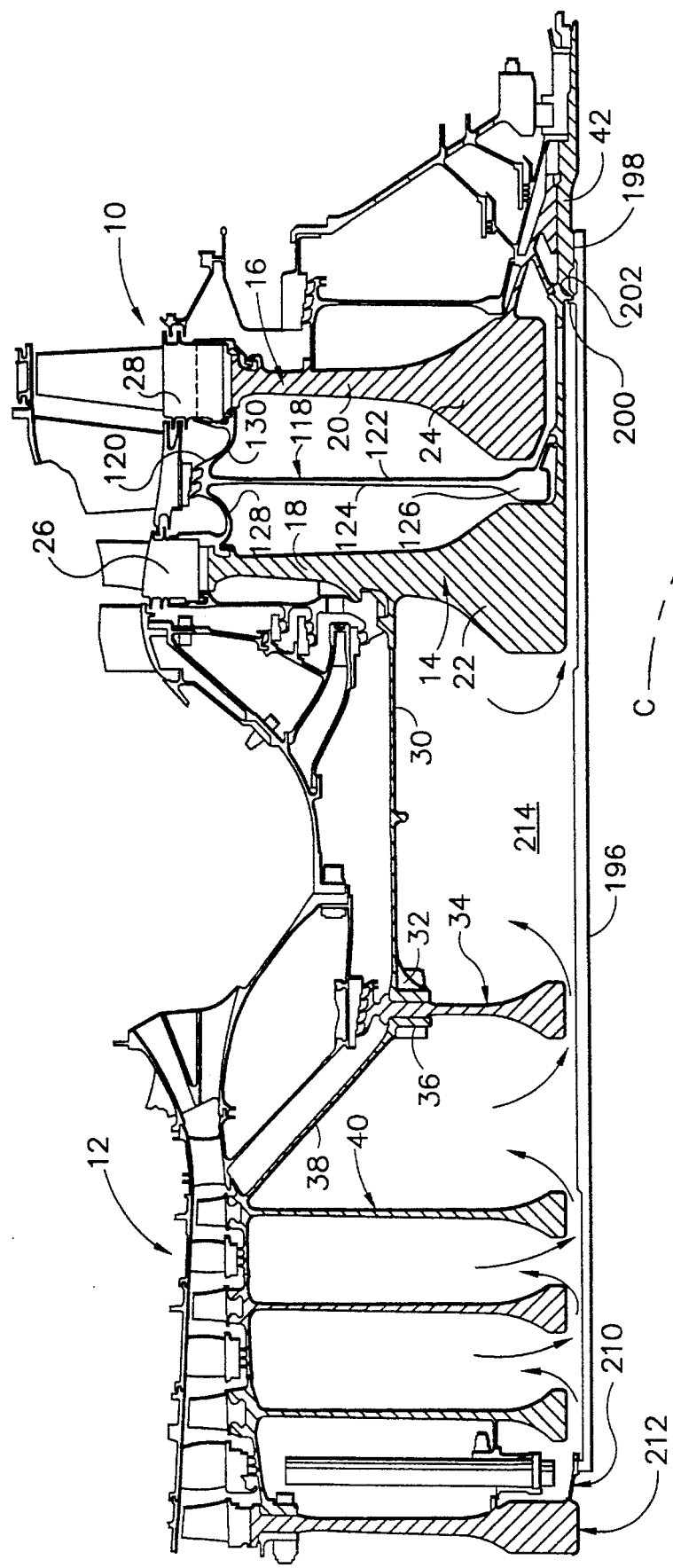
FIG. 1 is a schematic, side elevation of the compressor section and turbine section of a gas turbine engine embodying the present invention.

As shown in FIG. 1, the present invention includes modifications to the high pressure turbine section, generally designated 10, and high pressure compressor section, generally designated 12, of an aircraft-type high bypass ratio gas turbine engine. The turbine section 10 includes first and second stage disks 14, 16, each having a web 18, 20 extending radially outward from a bore 22, 24 respectively. The webs 18, 20 each terminate in a disk rim consisting of a plurality of blade dovetail slots 26, 28, respectively.

The first stage disk 14 includes a forward shaft 30 which is integral with the web 18 and terminates in a downwardly-extending flange 32. Flange 32 is connected to a disk 34 by bolts 36. Such bolts also connect the disk 34 to the rearwardly-extending cone 38 of the final stage compressor disk 40. Accordingly, torque generated by the turbine section 10 is transmitted to the compressor section 12 by forward shaft 30.

Figure 2:
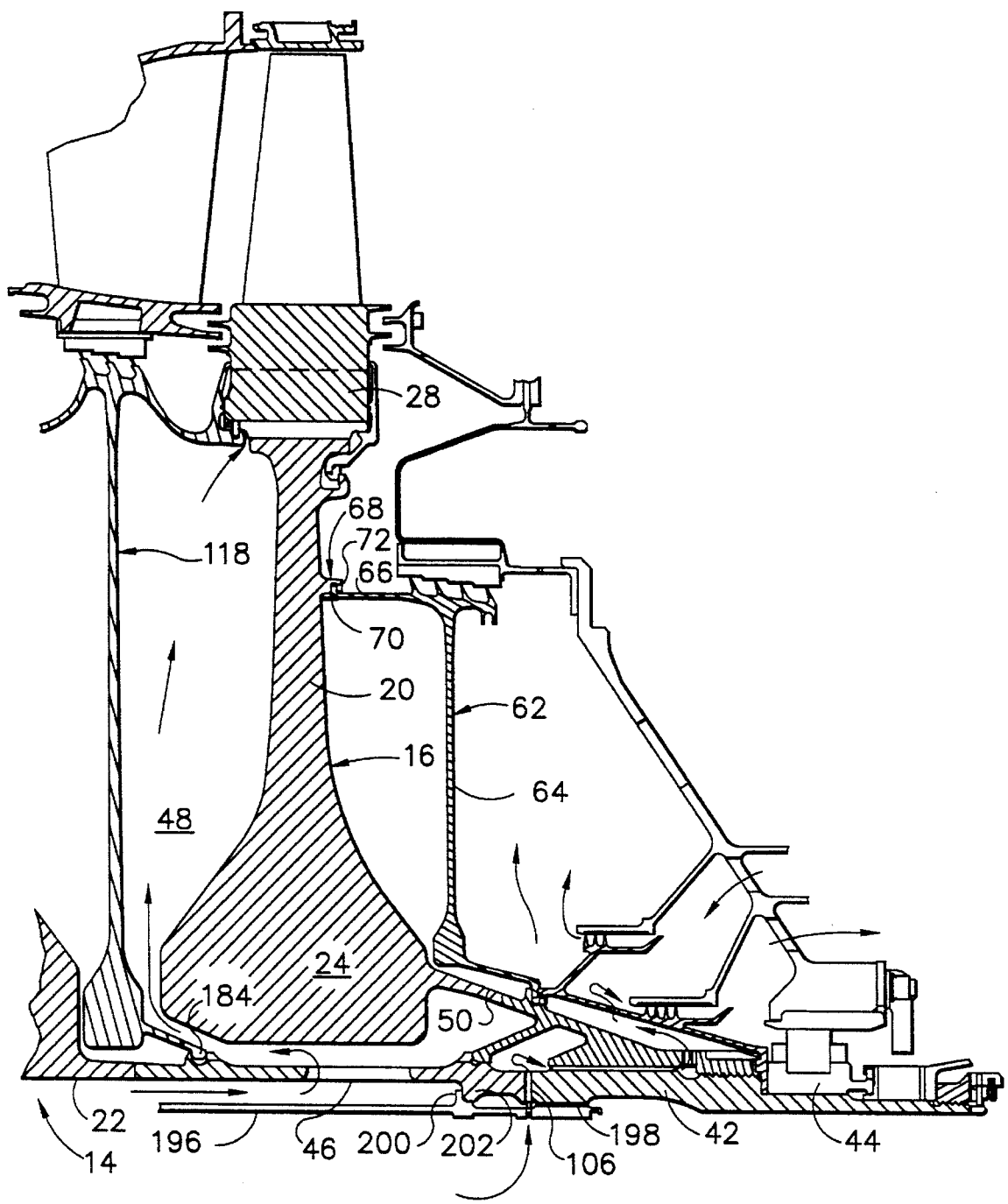
FIG. 2 is a detail of the engine of FIG. 1 showing the second stage disk and first stage aft shaft.

As shown in FIGS. 1 and 2, bore 22 of first stage disk 14 includes a rearwardly-extending aft shaft 42 which is threaded into engagement with a bearing 44. The shaft 42 includes a plurality of openings 46 which allow cooling air to enter the interstage volume 48.

Figure 3:
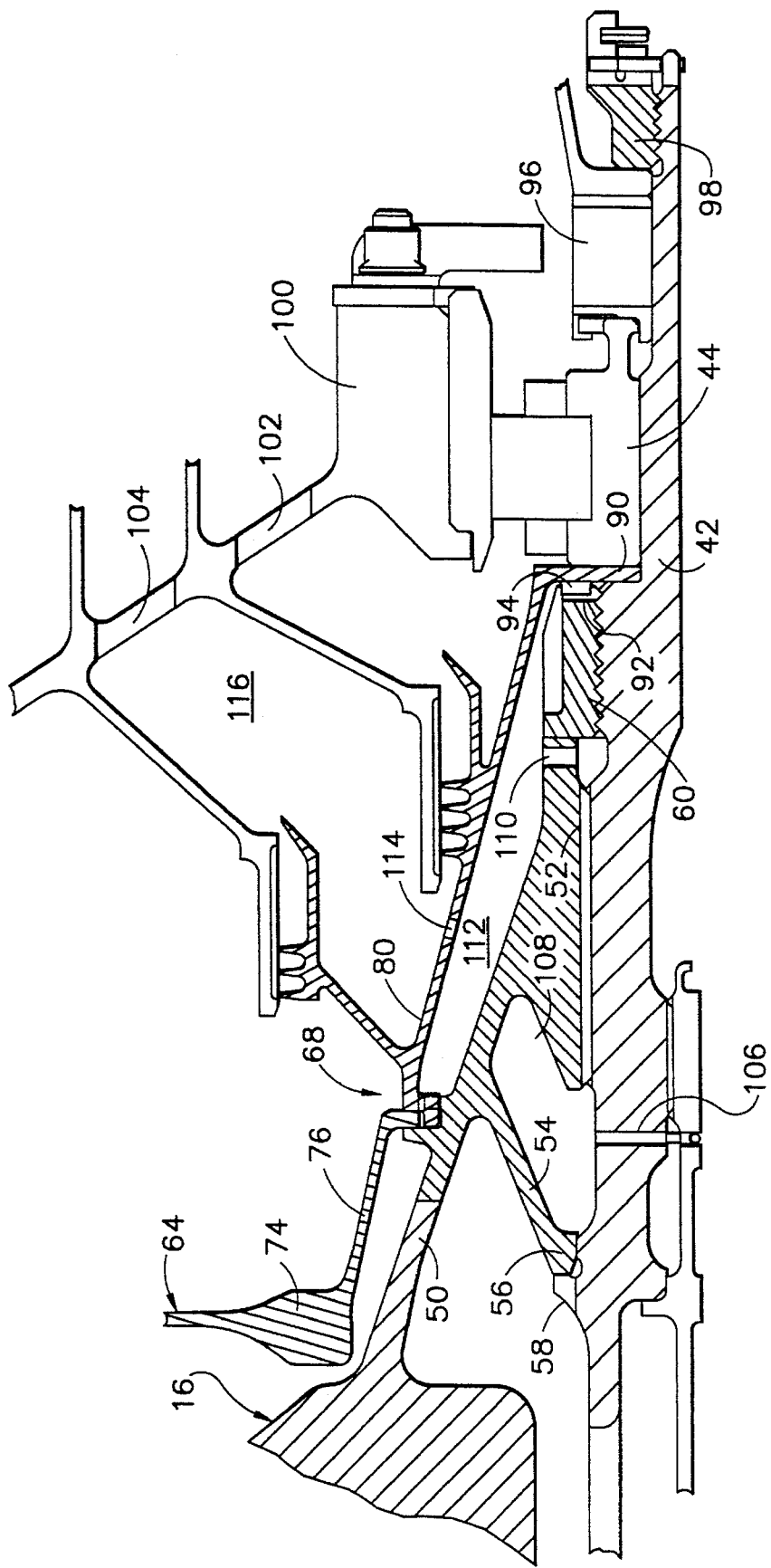
FIG. 3 is a detail of FIG. 2 showing the connection between the second stage disk and aft shaft.

As shown in FIG. 3, the second stage disk 16 includes a conical rear arm 50 which engages the aft shaft 42 in a splined connection 52. Conical arm 50 includes a forwardly-extending conical arm 54 which terminates in a mate face and pilot 56. Mate face and pilot 56 engages a correspondingly-shaped peripheral rib 58 formed on the aft shaft 42.

The second stage disk 16 is secured in its splined connection 52 by a locking nut 60 which is threaded on the aft shaft 42 rearwardly of the arm 50. Consequently, the locking nut 60 urges the mate face and pilot 56 into engagement with the rib 58 to ensure accurate axial alignment of the second stage bore 16 with respect to the first stage bore 14. Further, the geometry of the pilot arm 54 creates an additional radial load for increased centering of the disk 16 with respect to disk 14. In the preferred embodiment, the pilot 56 is spaced from splined connection 52 a distance greater than the attenuation distance to ensure accurate location of the second stage disk 16 during operation.

As shown in FIG. 2, an aft seal 62 includes a disk 64 having a forward shaft 66 which engages the web 20 of the second stage bore 16 in a bayonet connection 68. Shaft 66 includes a plurality of radially outward-extending tabs 70 about its outer periphery which engage and lock corresponding tabs 72 formed on the web 20. Accordingly, bayonet connection 68 prevents relative axial movement between the aft seal 62 and second stage disk 16.

Figure 4:
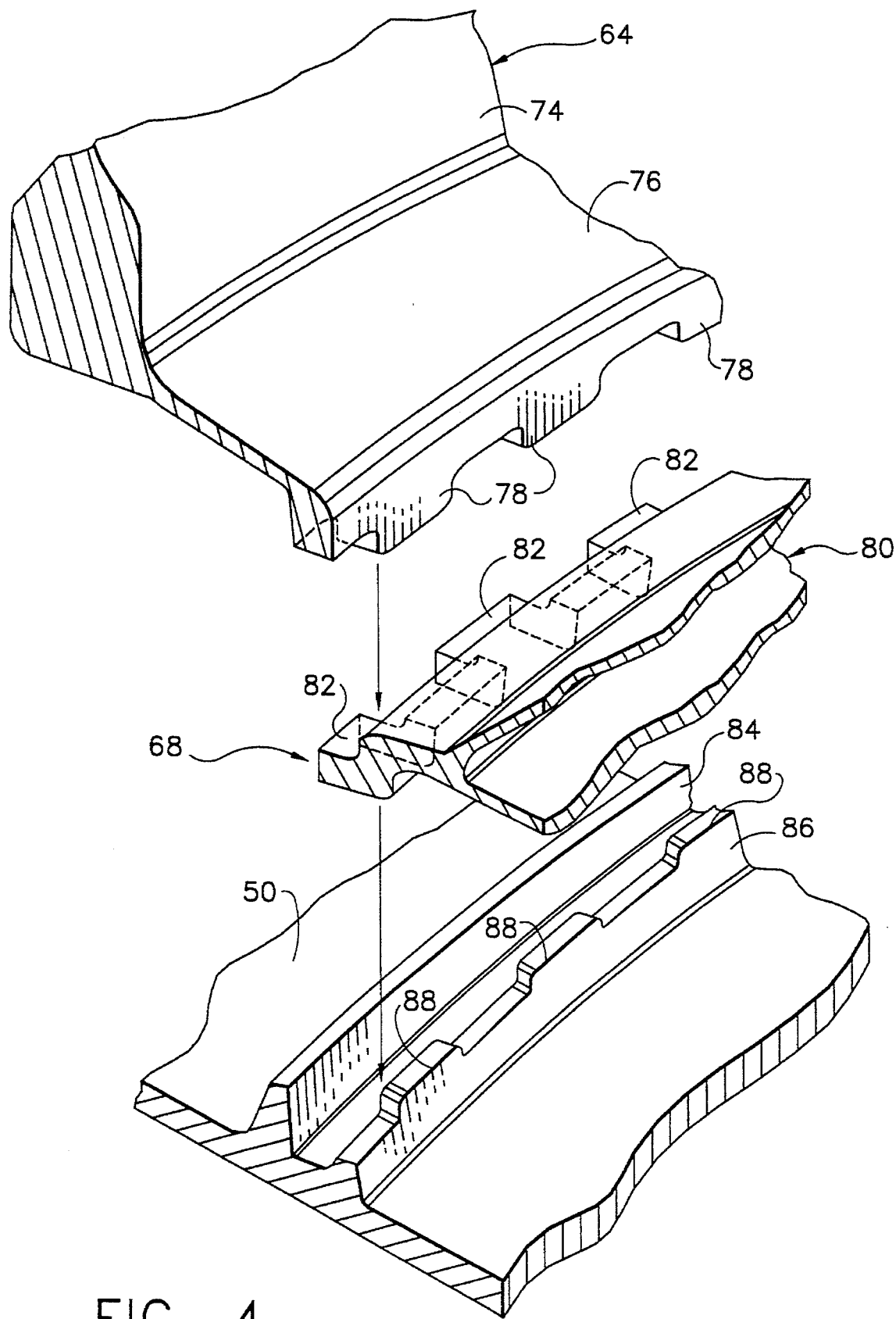
FIG. 4 is an exploded view showing the interconnection between the aft seal, sump seal and aft cone of the second stage disk in perspective.

As shown in FIGS. 3 and 4, the bore 74 of disk 64 includes a rearwardly-extending conical arm 76 terminating in downwardly-extending tabs 78. A sump seal 80 includes generally axially-extending tabs 82. Conical arm 50 includes an outer peripheral rib 84 and a parallel, peripheral rib 86 terminating in radially-extending tabs 88. When the aft seal 62 is positioned as shown in FIG. 2, the tabs 78 are positioned in alignment with tabs 88 in the space between rib 84 and rib 86. Sump seal 80 is positioned such that tabs 82 are inserted between tabs 78 and tabs 88, thereby preventing relative rotation of the aft seal 62 and sump seal 80 relative to second stage disk 16.

Figure 3A:
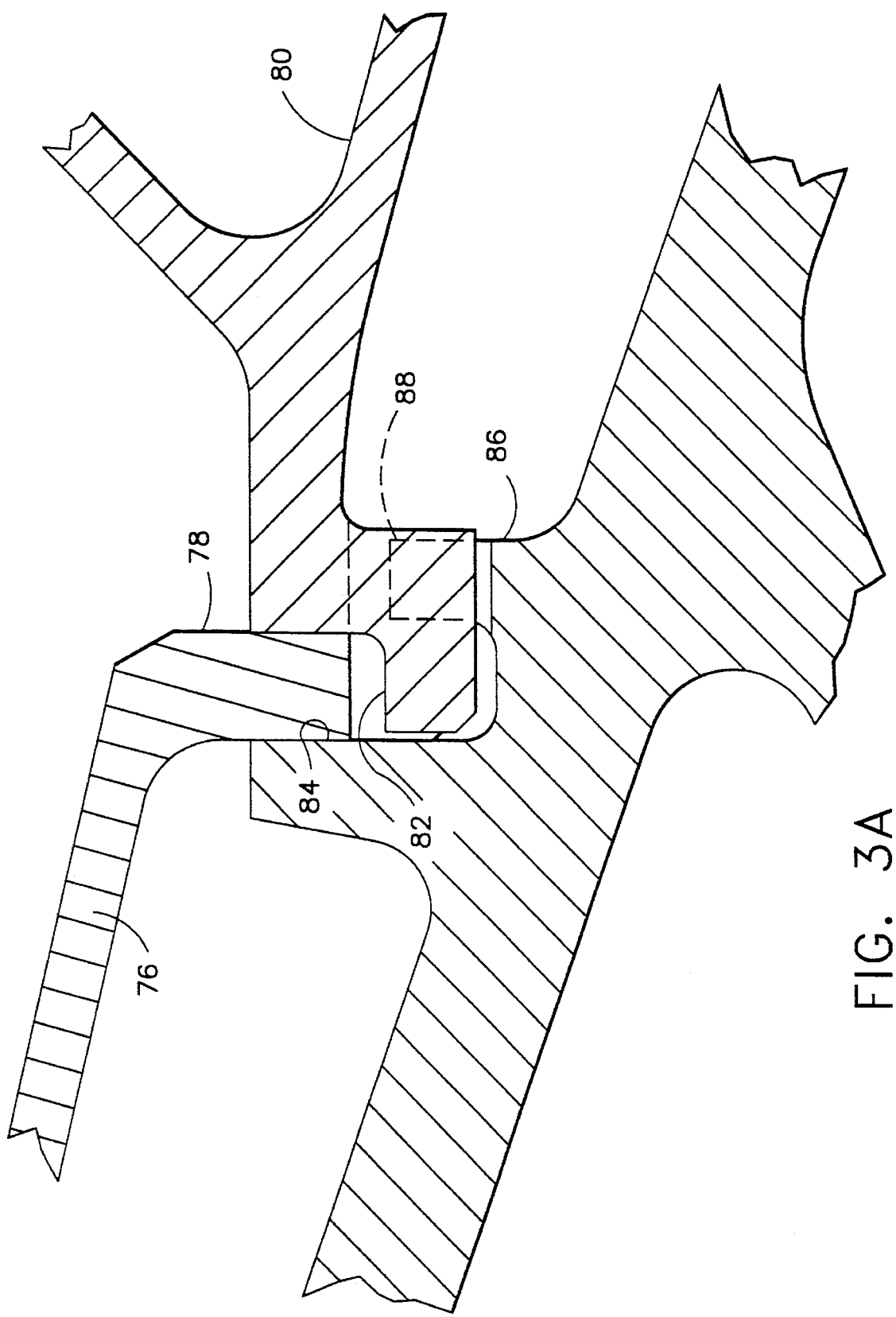
FIG. 3A is a detail side elevation of the components of FIG. 4 in assembled configuration.

As shown in FIGS. 3 and 3A, the sump seal 80 includes a radially-extending rear face 90 having axially projecting tabs 92 that engage slots 94 formed in the locking nut 60. Engagement of tabs 92 in slots 94 prevents unwanted relative rotation of the locking nut 60 during turbine operation. The bearing 44 abuts a spacer 96 which, in turn, is secured in position by a spanner nut 98 on aft shaft 42. Accordingly, spanner nut 98 urges bearing 44 against rear face 90 to ensure axial positioning of sump seal 80.

Bearing 44 is attached to frame 100 which includes openings 102, 104. Cooling air is conveyed from the interior of the engine through orifice 106 into the chamber 108 between the arm 54 and arm 50. The cooling air flows from chamber 108 through splined connection 52, then through opening 110 to the volume 112 between the sump seal 80 and arm 50. Sump seal 80 includes orifices 114 which allow the cooling air to flow outwardly to the buffer cavity 116 where it then continues to flow rearwardly through opening 104.

As shown in FIG. 1, the turbine section 10 includes an interstage seal, generally designated 118. The seal 118 includes an outer shell 120 and a central disk 122 having a web 124 and a bore 126. Shell 120 includes a forward arm 128 and an aft arm 130, connected to first and second stage disks 14, 16, respectively.

Figure 5:
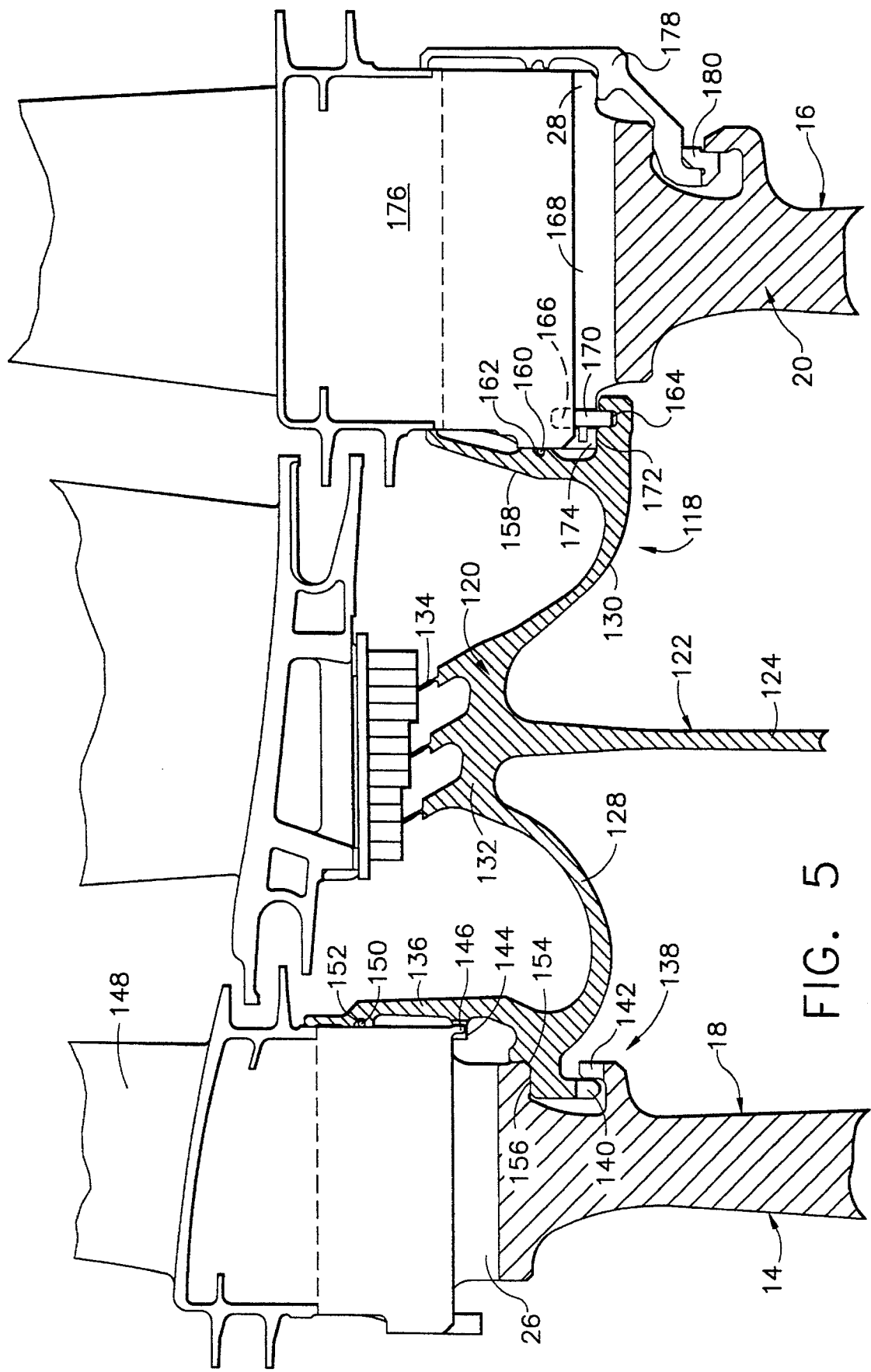
FIG. 5 is a detail of the engine of FIG. 1 showing the outer shell of the interstage shield.

As shown in FIG. 5, the shell 120 is generally cylindrical in shape, and the forward and aft arms 128, 130 each have an inwardly convex shape. More specifically, the forward and aft arms 128, 130 each have a catenary curve, which extends from the mid-portion 132 which supports seal teeth 134, to the respective disks 14, 16.

Figure 6:
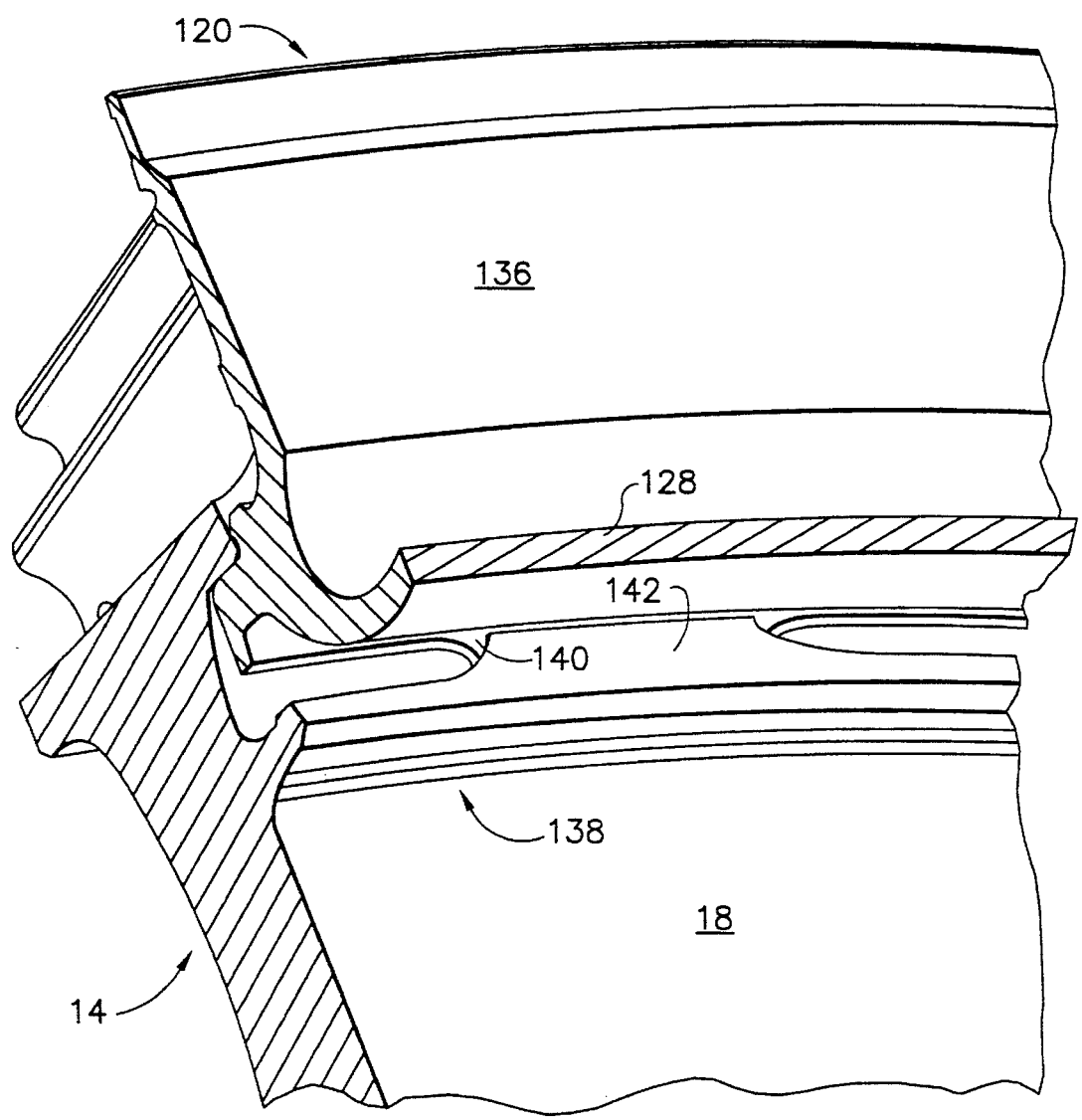
FIG. 6 is a detail of FIG. 5 showing the bayonet connection between the interstage shield and first stage disk.

The forward arm 128 includes a radially-extending blade-retaining rim 136 and forms a bayonet connection 138 with disk 18. As shown in FIG. 6, bayonet connection 138 includes a plurality of radially inwardly-extending tabs 140 extending from forward arm 128 which mesh with radially outwardly-extending tabs 142 formed on web 18 of disk 14. As shown in FIG. 5, rim 136 includes axially-extending tabs 144 arranged in pairs (only one of which is shown in FIG. 5) which engage downwardly-depending tabs 146 formed on the roots of first stage blades 148. In the preferred embodiment, four such tab engagements 144, 146 are formed on the connection between seal 118 and first stage disk 14 and are equally spaced about the periphery of the disk.

Rim 136 also includes a wedge shaped opening 150 which receives an annular seal wire 152, thereby providing a fluid tight seal between the rim 136 and blade dovetail slots 26. Forward arm 128 also includes a peripheral rabbet 154 which engages an undercut 156 formed in the web 18. Consequently, forward axial movement and outward radial movement of forward arm 128 relative to disk 14 is prevented by the engagement of rabbet 154 with undercut 156. Rearward axial movement of forward arm 128 relative to disk 14 is prevented by engagement of tabs 140, 142 of bayonet connection 138.

Aft arm 130 includes an annular, peripheral rim 158 which engages blade dovetail slots 28 and acts as a blade retainer. A seal is effected by a wedge shaped slot 160 and seal wire 162 as with rim 136. Aft arm 130 includes a peripheral groove 164 which is aligned with a corresponding slot 166 formed in the disk post 168. A split ring 170 is positioned in the passageway formed by slot 164 and groove 166 and thereby prevents relative axial movement between aft arm 130 and disk 16.

Disk post 168 includes a peripheral surface 172 which abuts corresponding surface 174 to form a radial rabbet which prevents outward radial movement of arm 130 relative to disk 16. The split ring 170 is urged radially inwardly into slot 164 by blade 176. Blade 176 is of conventional design, having an airfoil which includes serpentine coolant flow circuitry which communicates with the dovetail slot 28 and orifics exits in its side walls and end cap. Examples of such blade designes are disclosed in Bobo U.S. Pat. No. 3,356,340 and Le Maoût et al. U.S. Pat. No. 4,668,167, the disclosures of which are in coorporated herein by reference. Blade 176 is retained within dovetail slot 28 from the rearward side of the second stage disk by a blade-retaining rim 178 which, in turn, is secured to disk 16 by split ring 180.

Figure 7:
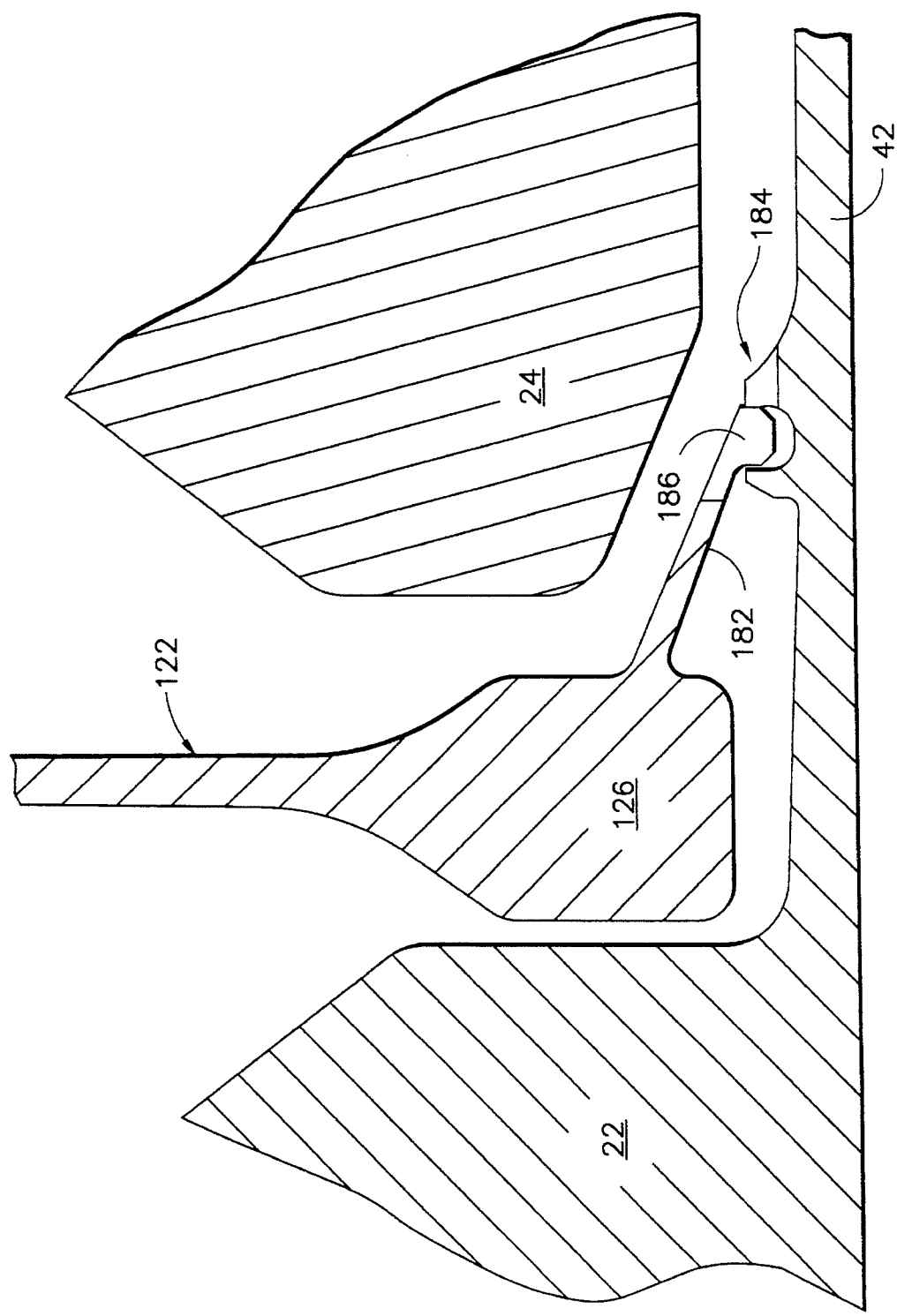
FIG. 7 is a detail of FIG. 1 showing the engagement between the interstage seal bore and aft shaft.
Figure 8:
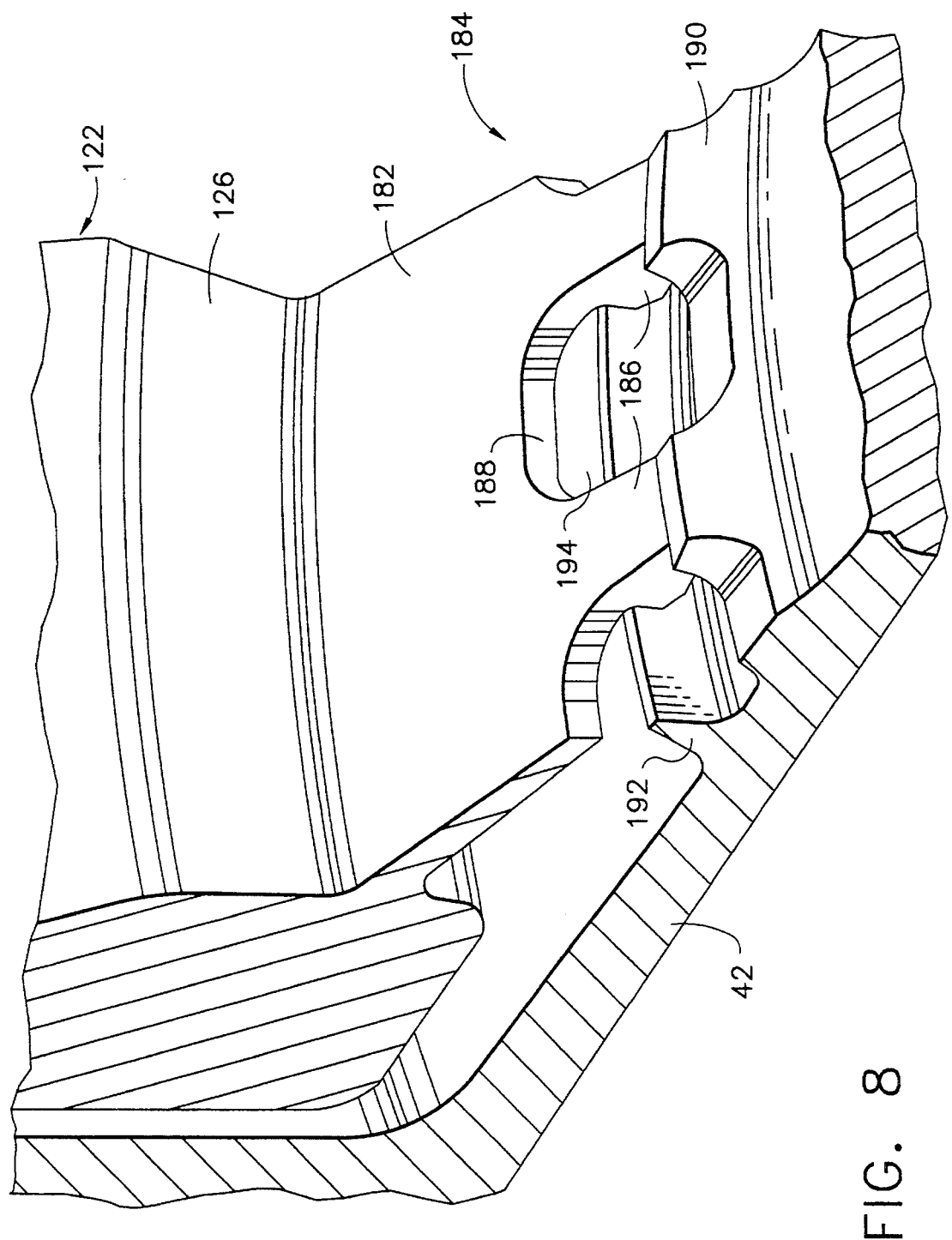
FIG. 8 is a detail showing the bayonet connection between the bore and aft shaft of FIG. 7.

As shown in FIGS. 7 and 8, disk 122 includes a bore 126 having a conical, rearwardly-extending arm 182 which engages the aft shaft 42 in a bayonet connection 184. Bayonet connection 184 includes tabs 186 which are spaced apart by scallops 188 (FIG. 8 only). Aft shaft 42 includes radially projecting tabs 190 which are spaced from a peripheral rim 192. When the tabs 186, 190 are aligned, the scallops 188 provide openings 194 through which cooling air may circulate. Bayonet connection 184 prevents the relative axial movement between bore 126 and aft shaft 42.

To assemble the turbine section 10, the seal 118 is slipped over the aft shaft 42 until the rim 136 comes into contact with the disk 14. The seal 118 is rotated so that the tabs 140 mesh with tabs 142, then the seal is rotated to the configuration shown in FIG. 6 wherein the tabs form a locking engagement. Simultaneously, the bayonet connection 184 is effected between the bore 126 and aft shaft 42. It should be noted that, in order to provide clearance for the tabs 186 of the bore 126, it may be necessary to scallop the rib 58 (see FIG. 3).

The second stage disk 16 is then slipped over the aft shaft 42 until the pilot 56 engages the rib 58. Split ring 170 at this time is expanded into groove 166. Insertion of blade 176 forces the ring 170 into a constricted configuration shown in FIG. 5, in which it engages slot 164. The second stage disk 16 is secured to aft shaft 42 by locking nut 60 in the manner previously described.

In the preferred embodiment, the shell 120 is shaped such that the forward and aft arms 128, 130 are flexed or prestressed when the second stage disk 16 is mounted on the aft shaft 42. This preload ensures axial engagement of the seal 118 to the disks 14, 16 during operation. The catenary shape of the arms 128, 130 optimizes the transfer of this preload with minimal bending stress.

Figure 9:
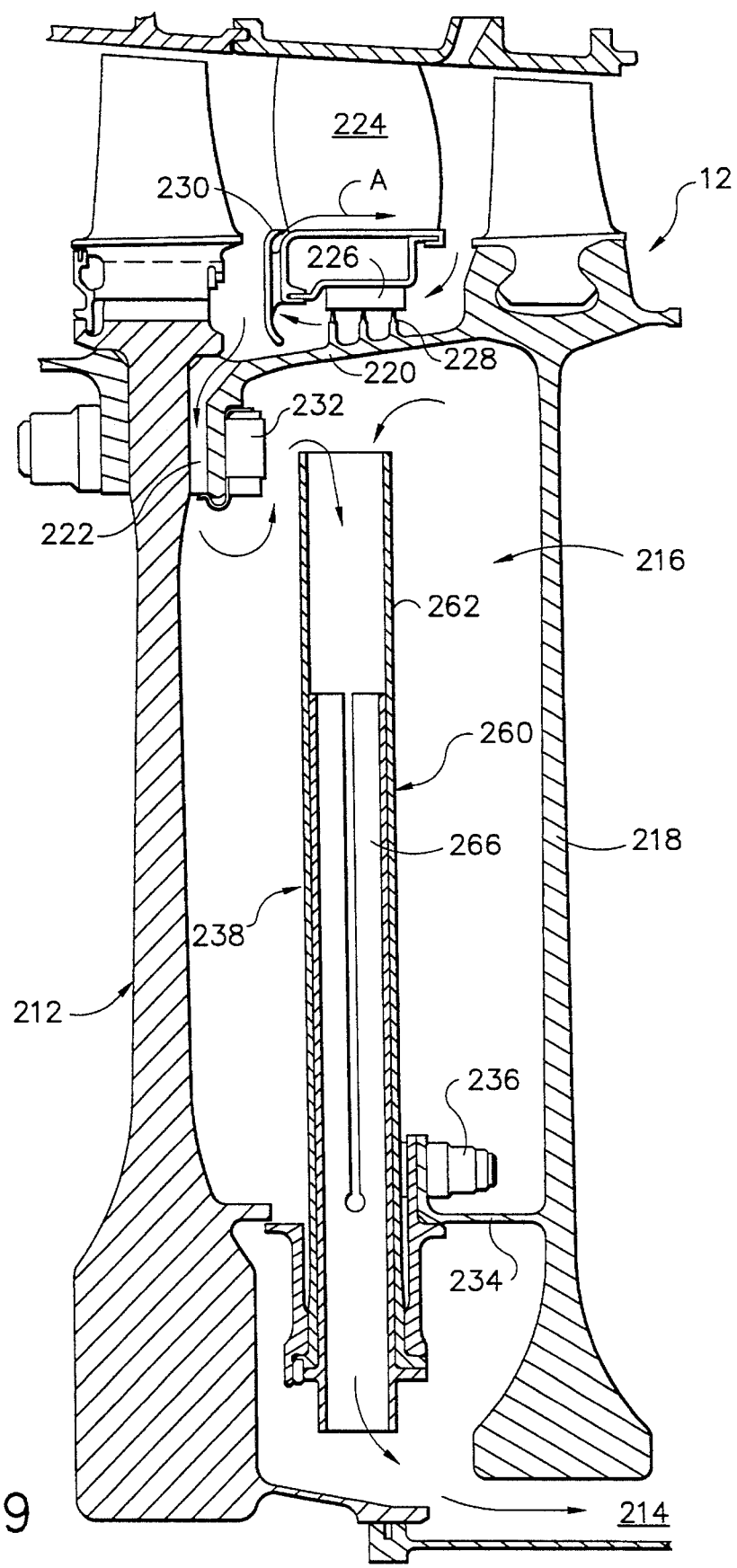
FIG. 9 is a detail of FIG. 1 showing the radial inflow impeller.
Figure 10:
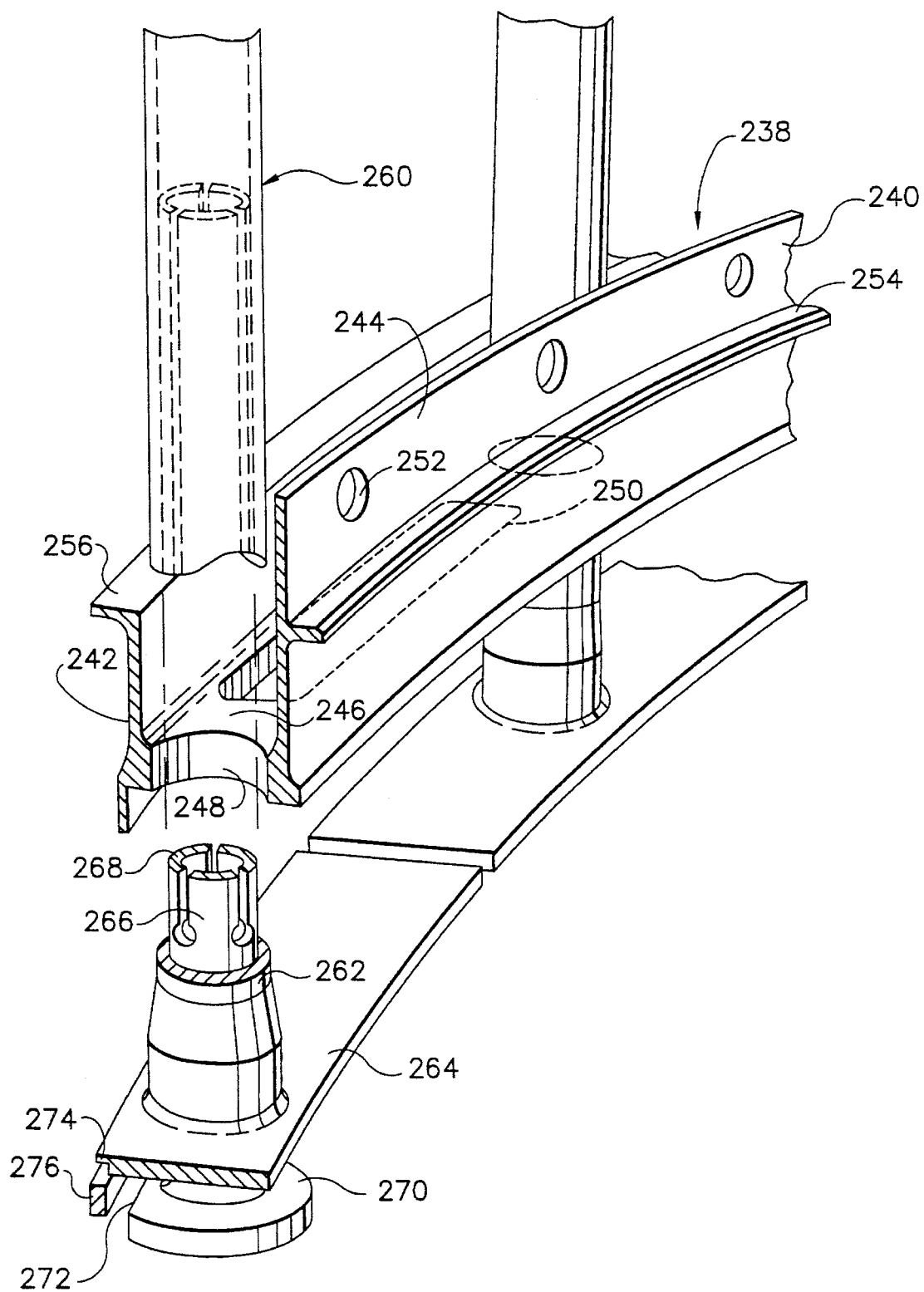
FIG. 10 is a detail of the radial inflow impeller of FIG. 9 shown exploded and in perspective.

As shown in FIGS. 1 and 2, a cylindrical conduit 196 is concentric with the aft shaft 42 and engine centerline C, and is attached to the aft shaft by a threaded engagement 198. The conduit 196 is axially positioned relative to the aft shaft 42 by a rabbet 200 which engages a rib 202 on the shaft 42. As shown in FIGS. 1, 9 and 10, the conduit 196 extends forwardly to terminate in a peripheral slot 204 which carries a split ring 206 that engages a bearing surface 208 formed on a rearwardly-extending conical arm 210 of the stage seven disk 212 of the compressor section 12. Accordingly, a longitudinal cooling air conduit, generally designated 214, is formed which extends from the interstage volume 216, formed between the seventh and eighth stage disks 212, 218, respectively, rearwardly beneath the compressor section, within the forward shaft 30 of the first stage disk 14, and beneath the aft shaft 42.

As shown in FIG. 9, the eighth stage disk 218 includes an integral shield 220 having a plurality of radially-extending passages 222 which allow cooling air from the compressor section 12 to enter the volume 216. The stator blade 224 includes a honeycomb block 226 which is engaged by seal teeth 228 on the shield 220 to prevent a reverse circular air flow pattern as indicated by the arrows A. This circular air pattern is diverted away from the passageways 222 by a deflector plate 230. Shield 220 extends forwardly from disk 218 and is secured to disk 212 by bolts 232.

As shown in FIGS. 9 and 10, disk 218 includes an L-shaped annular flange 234 which is connected by bolts 236 to a vortex tube impeller assembly 238. Impeller assembly 238 includes an annular bracket 240 having forward and rearward walls 242, 244, respectively, connected by a web 246 having a plurality of spaced holes 248 separated by rectangular openings 250. The rear wall 244 includes a plurality of bolt holes 252 which receive bolts 236. A rearwardly- extending rib 254 is positioned to engage flange 234 to provide appropriate radial location of the assembly 238. Forward wall 242 includes an annular rib 256 which is positioned adjacent a corresponding rib 258 (see FIG. 9), thereby forming a labyrinth seal.

The vortex tube impeller assembly 238 includes a plurality of conduit elements 260, each of which is inserted through a hole 248. Each conduit element 260 includes an outer tube member 262 having a rectangular flange 264 adjacent a radially-inner end. The outer tube member 262 is shaped to be received within the hole 248 in a press fit, and the flange 264 is shaped to lie along the inner radial surface of the web 246, partially covering the opening 250. When the members 262 are pressed into holes 248, the openings 250 are completely covered by the flanges 264 of the conduit elements 260, the flanges being in abutting relation to one another.

Each conduit element 260 also includes a tubular insert 266 which terminates at a radially-outer end in three longitudinal segments 268. The insert 266 includes a peripheral flange 270 adjacent to its radial inner end which provides radial location of the insert relative to the outer tube 262. The flange 270 includes a flat 272 which aligns with a peripheral rabbet 274 to receive a locking ring 276. Locking ring 276 engages front wall 242 and secures the conduit element 260 in the bracket 240 when the turbine engine is shut down.

Figure 11:
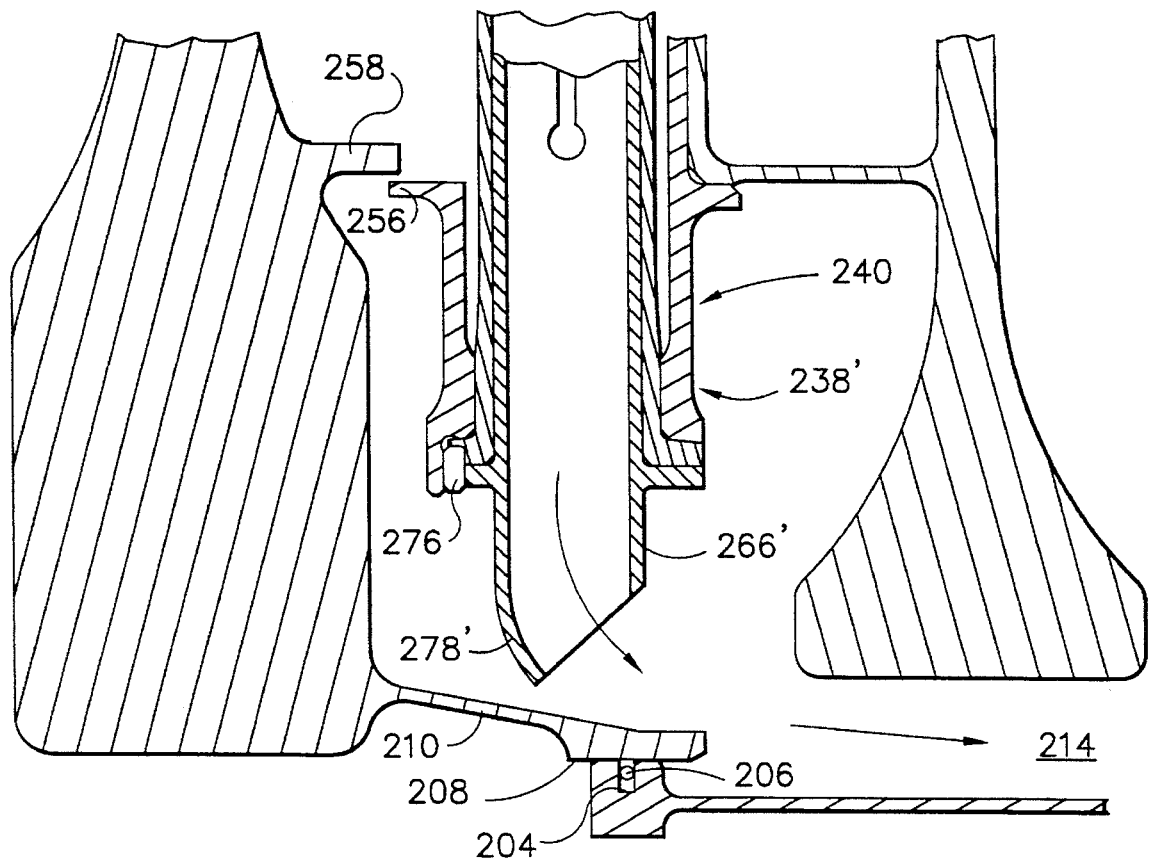
FIG. 11 is a detail showing an alternate embodiment of the impeller of FIG. 9.

The insert 266 functions to change the vibration characteristics of the outer tube 262, thereby reducing vibrations of the conduit element 260 during operation. In an alternate embodiment of the tube assembly 238' shown in FIG. 11, the insert 266' terminates in an angled nozzle 278 which aids in directing cooling air rearwardly along the conduit 214 (see FIG. 1).

In operation, rotation of the compressor section 12 causes cooling air to be drawn through passageway 222 into interstage volume 216. The air is then pumped radially inwardly by conduit elements 260 to conduit section 214, where the air then flows rearwardly along the conduit 196 to aft shaft 42. At aft shaft 42, the cooling air passes through orifices 46 to the interstage volume 48 where it mixes with air between the disks and bathes the bore 24 of second stage disk 16 as it flows upwardly to blade dovetail slots 28. From blade dovetail slots 28, the air flows radially outwardly through blades 176 and out through holes in the side walls and end cap in the blades. This air movement also draws cooling air from the volume 48 forward of the disk 118 through the bayonet connection 184, where it mixes with the cooling air from conduit 214. Thus, this mixed air serves a double duty: cooling and the second stage disk bore 16 and rim of disk 16, and cooling the blades 176 of the second stage turbine. Consequently, additional cooling air from other sources is not required for the blades 176, which increases the overall efficiency of the system, compared to prior art systems.

Further, as will become apparent, the second stage turbine is cooled by air from the compressor section supplied by a cooling circuit separate from the means for delivering cooling air to the forward face of the first stage turbine. This allows the cooling of the blades 148 to be controlled separately and independently from the cooling of the blades 176, which eliminates the situation in which cooling air supplied to the turbine blades of one stage is reduced in order to increase cooling air to the turbine blades of the other stage.

Figure 12:
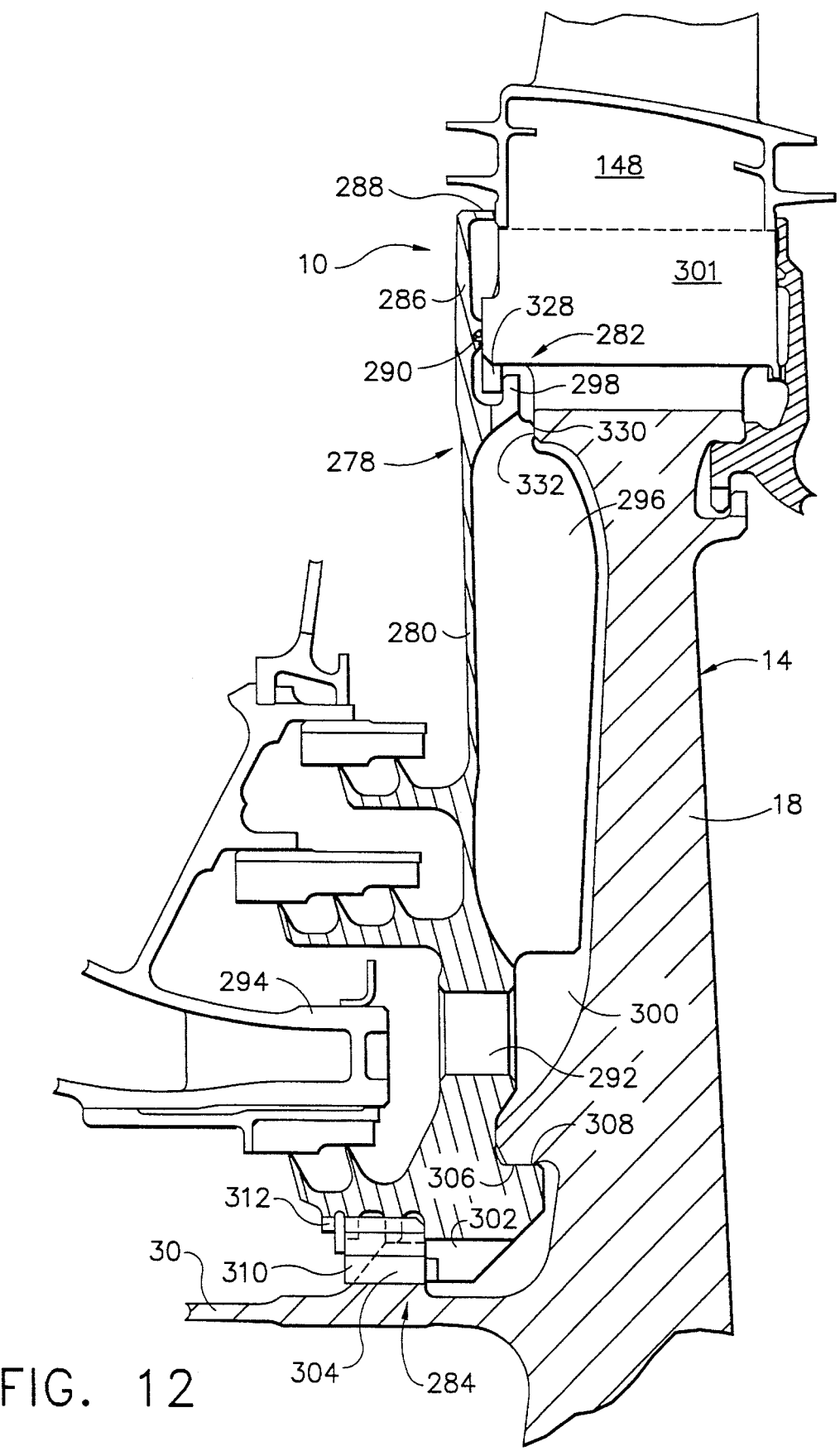
FIG. 12 is a detail of the engine of FIG. 1 showing the forward seal.

As shown in FIG. 12, the turbine section 10 includes a forward seal assembly, generally designated 278, which includes a faceplate 280 mounted on the first stage disk 14 by a bayonet connection 282 at a radially outer periphery, and a bayonet connection 284 at a radially inner periphery. The faceplate 280 includes a blade retaining outer rim 286 which terminates in an axial flange 288 contacting the first stage blade 148. A seal is provided by a wedge-shaped slot and seal wire combination 290.

Figure 13:
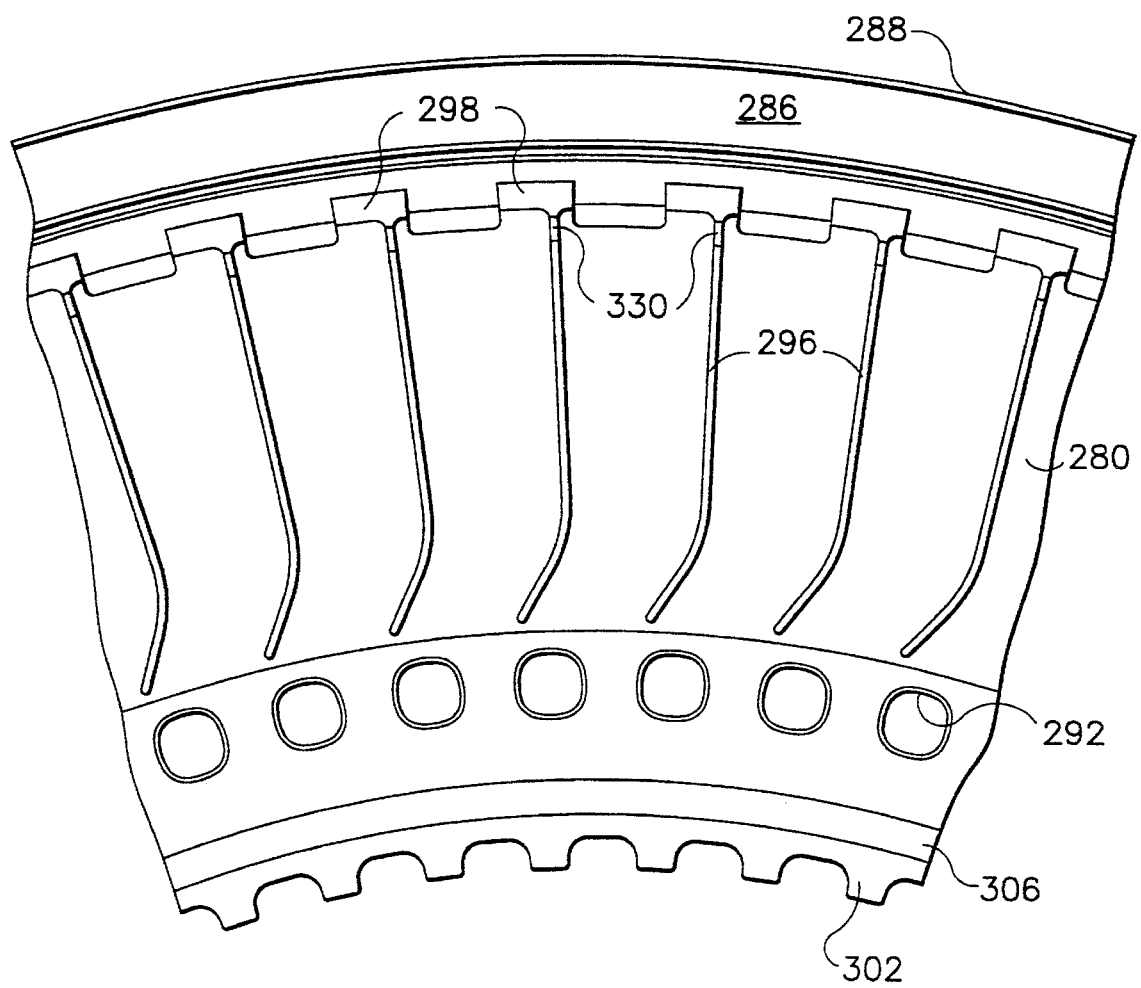
FIG. 13 is a detail of FIG. 12 showing the aft face of the forward seal faceplate.

As shown in FIGS. 12 and 13, the faceplate 280 includes a plurality of axial openings 292 adjacent to the inner periphery which receive cooling air from a stationary, multiple-orifice duct 294. The interior, rearward surface of the faceplate 280 includes a plurality of radially-extending guide vanes 296 which extend from the openings 292 to the tabs 298 of the bayonet connection 282. The guide vanes 296 direct cooling air through the volume 300 radially outwardly to the blade root 301 where it cools the blade and passes through blade passages (not shown).

Figure 14:
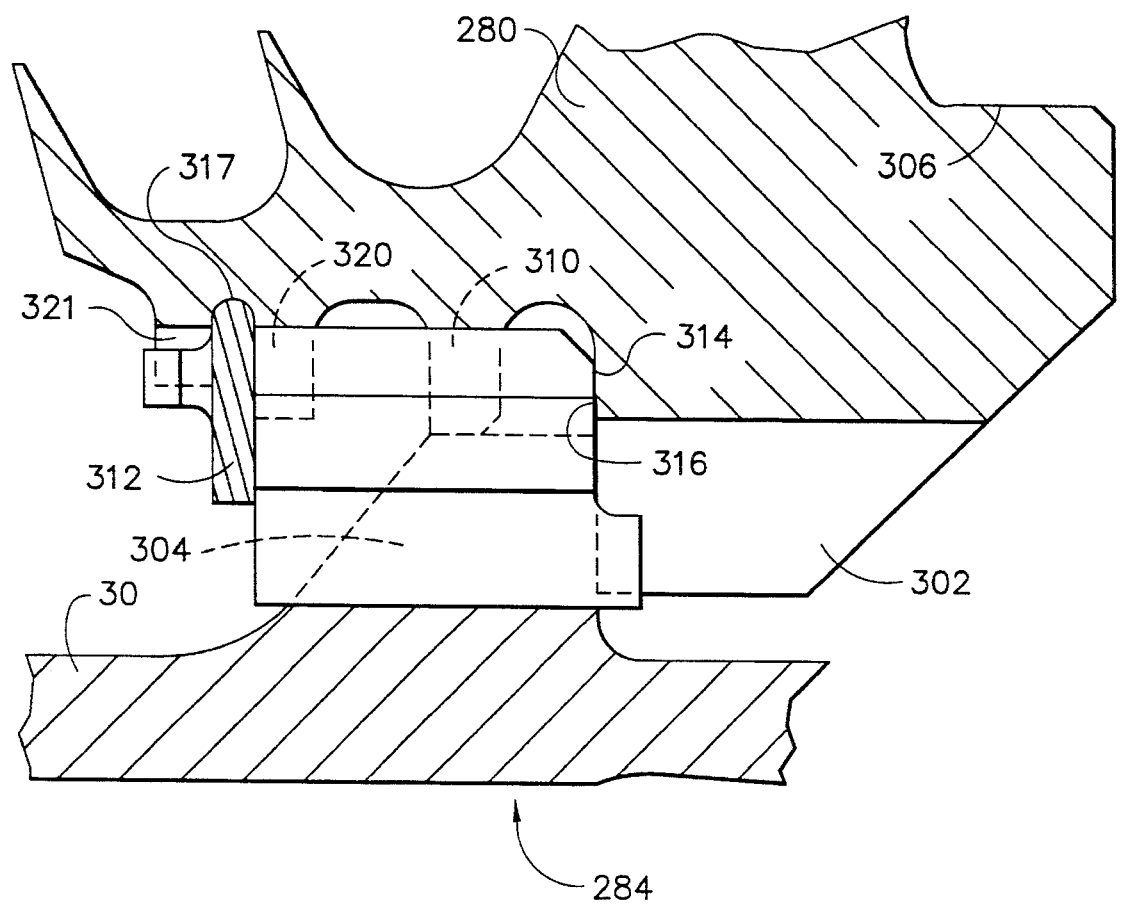
FIG. 14 is a detail of FIG. 12 showing the bayonet connection between the forward seal and first stage disk.

As shown in FIGS. 12 and 14, bayonet connection 284 is formed by engagement of spaced tabs 302 extending radially inwardly from faceplate 280 (see also FIG. 13) and spaced tabs 304 extending radially outwardly from the forward shaft 30 of disk 14. A radial rabbet 306 (FIG. 12) is formed on the aft surface of faceplate 280 and engages a peripheral rib 308 extending forwardly from the web 18. Accordingly, engagement of tabs 302, 304 prevents forward axial movement of faceplate 280 relative to disk 14, and engagement of radial rabbet 306 with rib 308 prevents rearward axial and outward radial movement of the faceplate.

Relative circumferential movement of faceplate 280 and disk 14 is prevented by locking pin 310, which is inserted in the spaces between aligned tabs 302, 304. Preferably, two pins 310 are employed and are spaced at intervals about the inner periphery of faceplate 280 so as to offset any imbalance of the faceplate. The locking pins 310 are secured from relative forward axial movement by a locking ring 312 and include a rearward face 314 which abuts a stop surface 316 formed on the faceplate 280. Locking ring 312 is seated within a groove 317 formed between two rows of tabs 320, 321, formed on faceplate 280 and which are aligned with tabs 302 to provide clearance for the pins 310.

As shown in FIGS. 15 and 16, each of the locking pins 310 includes a rearward projection 318 which engages tabs 302 (see FIGS. 13 and 14) and a threaded extraction hole 322, which facilitates axial removal of the pin 310 by a correspondingly-shaped threaded extraction tool. As shown in FIGS. 17 and 18, the retaining ring 312 includes a split hoop segment 323 which is connected to a centering block 324 by a transition flange 326. Block 324 is shaped to fit between adjacent tabs 321 (see FIG. 14) to prevent rotation of the ring 312 relative to the faceplate 280.

As shown in FIG. 12, bayonet connection 282 includes interlocking tabs 298, 328, the latter of which are formed on the outer periphery of the first stage disk web 18. Vanes 296 (see also FIG. 13) each include aft bearing surfaces 330 which engage mating bearing surfaces 332 formed on web 18. Accordingly, axial movement of faceplate 280 in a forward direction is prevented by the engagement of tabs 298, 328 of bayonet connection 282, and axial movement in a rearward direction is prevented by engagement of bearing surfaces 330, 332.

Figure 19:
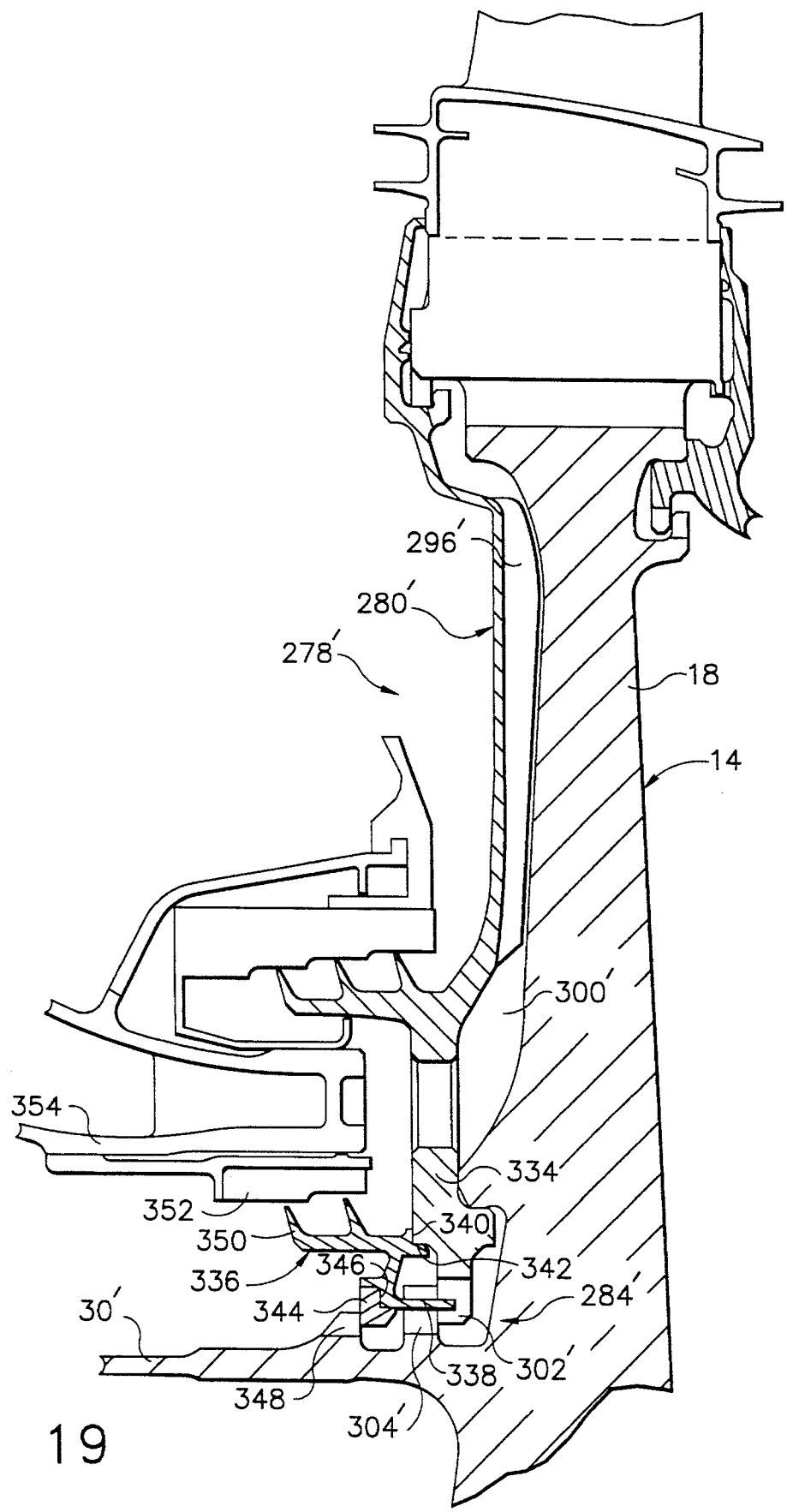
FIG. 19 is an alternate embodiment of the forward seal assembly of FIG. 12.
Figure 20:
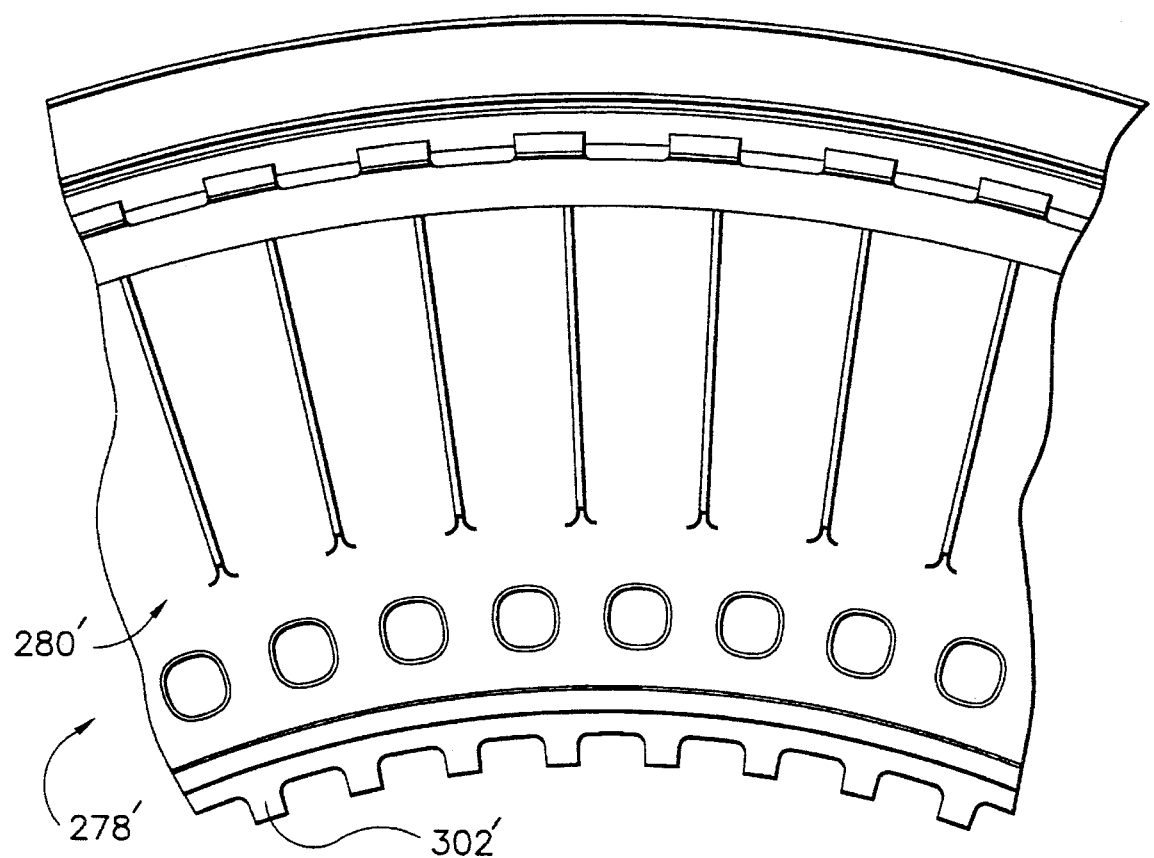
FIG. 20 is a rear elevational view of the forward seal faceplate of FIG. 19.

As shown in FIGS. 19 and 20, an alternate embodiment of the forward seal assembly 278' is shown in which faceplate 280' is configured to conform to the contour of the web 18 on which it is mounted. Accordingly, vanes 296' are shallower in depth than the vanes 296 of the embodiment of FIG. 12 since the volume 300' is reduced. This allows the bore 334 of the faceplate 280' to be reduced in volume as well since the overall mass of the faceplate is reduced, and its distance from the center of rotation of the disk 14 is reduced, thereby reducing bending moments which arise during operation.

Accordingly, bayonet connection 284' includes engagement of tabs 302' and 304', which prevents forward axial movement of faceplate 280' relative to disk 14. Relative rotation of faceplate 280' is prevented by a locking cylinder 336 which includes a plurality of flanges 338 that are shaped to be inserted in the spaces between the aligned tabs 302', 304'. Locking cylinder 336 includes a peripheral rabbet 340 which engages an undercut 342 in the faceplate 280' to provide axial as well as radial location of the cylinder 336.

Forward axial movement is restricted by a locking ring 344 which includes a rabbet 346 that engages the cylinder 336. Locking ring 344 is captured between cylinder 336 and a plurality of radially outward-projecting tabs 348 formed on forward shaft 30' and shaped to provide clearance for locking tabs 302' of faceplate 280'. Locking cylinder 336 includes a seal rack 350 which engages a block 352 that is part of the turbine static structure 354 at that location.

The faceplate 280 is mounted on the disk 14 by rearward axial displacement along forward shaft 30 until the tabs 302, 304 and tabs 298, 328 are meshed, then the faceplate 280 is rotated or "clocked" until the tabs are aligned. The locking pin 310 is then inserted and secured with locking ring 312. Alternately, the locking cylinder 336 is positioned and secured with ring 344. The axial offset of radial rabbet 306 from the forward seal web creates a bending moment during operation. This bending moment is reduced by creating an opposing moment between tabs 302, 304 of bayonet connection 284.

In the preferred embodiment, the flange 288 is shaped to provide a degree of prestress to the faceplate 280 when mounted on the first stage disk 14.

While the forms of apparatus herein described constitute preferred embodiments of this invention, it is to be understood that the invention is not limited to these precise forms of apparatus, and that changes may be made therein without departing from the scope of the invention.

What is claimed is:

1. In a gas turbine engine of a type having a compressor section including first and second disks connected by a seal defining a compressor interstage volume, a turbine section including first and second stage disks connected by (a) an interstage seal defining a turbine interstage volume, and a compressor shaft interconnecting said compressor disks with said turbine disks, a turbine disk cooling system comprising:

means for drawing air from said compressor section into said compressor interstage volume and radially inward within said compressor interstage volume toward a centerline of said engine;

means for conveying said air from said compressor interstage volume to said turbine section; and means for mixing said air in said turbine interstage volume with cooling air in said turbine interstage volume adjacent said first stage turbine disk, wherein said cooling air is mixed with said compressor air by passing through said interstage seal and said mixed air passes from said turbine interstage volume through said second stage disk to cool said second stage disk.

2. The system of claim 1 wherein said air drawing means includes orifice means in said compressor seal for allowing air in said compressor section to enter said compressor interstage volume; and radial inflow impeller means for guiding said compressor air toward said conveying means.

3. The system of claim 2 wherein said impeller means includes a plurality of radially-extending conduit means suspended in said compressor interstage volume, said conduit means having a plurality of interior, radially-extending passages for conveying said compressor air from said orifice means to said conveying means.

4. The system of claim 3 wherein said conduit means includes a plurality of tubular conduit elements, each of said elements having one of said passages.

5. The system of claim 4 further comprising flange means, attached to one of said first and second compressor disks; and annular bracket means, attached to said flange means, for receiving said conduit elements.

6. In a gas turbine engine of a type having a compressor section including first and second disks connected by a seal defining a compressor interstage volume, a turbine section including first and second stage disks connected by a seal defining a turbine interstage volume, and a compressor shaft interconnecting said compressor disks with said turbine disks, a turbine disk cooling system comprising:

orifice means in said compressor seal for allowing air in said compressor section to enter said compressor interstage volume;

means for conveying said air from said compressor interstage volume to said turbine section;

radial inflow impeller means for guiding said compressor air toward said conveying means;

said impeller means including a plurality of radially-extending conduit means suspended in said compressor interstage volume, said conduit means having a plurality of interior, radially-extending passages for conveying said compressor air from said orifice means to said conveying means;

said conduit means includes a plurality of tubular conduit elements, each of said elements having one of said passages;

flange means attached to one of said first and second compressor disks;

annular bracket means, attached to said flange means, for receiving said conduit elements;

said bracket means includes a plurality of spaced, radially-extending openings, each of said openings receiving one of said conduit elements in a press fit; and means for mixing said air in said turbine interstage volume with cooling air in said turbine interstage volume adjacent said first stage turbine disk, wherein said mixed air passes from said turbine interstage volume through said second stage disk to cool said second stage disk.

7. The system of claim 6 wherein said conduit elements each include a peripheral flange adjacent a radially inward end thereof which engages a radially inner surface of said bracket means.

8. The system of claim 7 wherein said peripheral flange includes a rabbet and said bracket means includes a split ring in said rabbet.

9. The system of claim 8 wherein said conduit elements include insert means for reducing vibrations of said conduit means.

10. The system of claim 9 wherein said insert means includes a plurality of tubular inserts, each of said inserts being shaped to be press fitted into one of said conduit elements and having a radially outer portion divided into a plurality of spaced longitudinal segments and a radially inner portion protruding from said conduit element and including a peripheral flange shaped to engage said peripheral flange of said conduit element.

11. The system of claim 10 wherein said radial inflow impeller means includes flow discourager means, extending between said bracket means and the other of said compressor disks, for preventing said air exiting said conduit elements from flowing radially upwardly within said compressor interstage volume.

12. The system of claim 11 wherein said conveying means includes duct means, concentric with said engine centerline, for conveying said air from said compressor interstage volume to said turbine section.

13. The system of claim 12 wherein said first stage turbine disk includes an aft shaft, attached to said compressor shaft and concentric with said second stage turbine disk, said shaft having a plurality of openings therethrough allowing flow of said air from said duct means into said turbine interstage volume.

14. The system of claim 13 wherein said openings are positioned adjacent to said second stage disk whereby said cooling air washes over a bore thereof.

15. The system of claim 14 wherein said turbine interstage seal, includes a bore having a conical aft arm engaging said aft shaft, said engagement including channel means for allowing cavity purge air from said first stage disk to mix with said air from said duct means.

16. The system of claim 1 wherein said conveying means includes a cylindrical duct extending longitudinally within said compressor and turbine sections and being concentric with said engine centerline.

* * * * *